United States Patent [19]

Taniguchi et al.

[11] Patent Number: 5,190,096
[45] Date of Patent: Mar. 2, 1993

[54] CAR AIR CONDITIONING EQUIPMENT WITH TEMPERATURE VARIATION SYSTEM TO AVOID OCCUPANT BOREDOM WITH CONSTANT TEMPERATURE AIR

[75] Inventors: Yousuke Taniguchi; Hiroshi Aoki, both of Aichi, Japan

[73] Assignee: Kabushiki Kaisha Toyota Chuo Kenkyusho, Aichi, Japan

[21] Appl. No.: 620,460

[22] Filed: Dec. 3, 1990

Related U.S. Application Data

[63] Continuation of Ser. No. 269,718, Nov. 10, 1988, abandoned.

[30] Foreign Application Priority Data

Nov. 11, 1987 [JP]  Japan ................................ 62-284478

[51] Int. Cl.$^5$ ............................................ F25B 29/00
[52] U.S. Cl. ........................................ 165/12; 165/30; 165/42; 165/43; 165/64; 236/46 R; 236/46 F; 219/202; 237/12.3 R; 237/12.3 A
[58] Field of Search ................... 165/12, 42, 43, 30, 165/64; 236/46 R, 46 F; 219/202; 237/12.3 R, 12.3 A

[56] References Cited

U.S. PATENT DOCUMENTS

| | | | |
|---|---|---|---|
| 4,344,565 | 8/1982 | Kojima et al. | 165/12 |
| 4,345,714 | 8/1982 | Kojima | 165/12 |
| 4,478,274 | 10/1984 | Naganoma et al. | 165/12 |
| 4,494,184 | 1/1985 | Crevel | 364/557 |
| 4,495,560 | 1/1985 | Sugimoto | 62/244 |
| 4,571,950 | 2/1986 | Nariai | 62/180 |
| 4,665,971 | 5/1987 | Sakurai | 165/42 |
| 4,791,981 | 12/1988 | Ito | 165/42 |

FOREIGN PATENT DOCUMENTS

| | | | |
|---|---|---|---|
| 61-193915 | 8/1986 | Japan | 98/2.11 |
| 61-193916 | 8/1986 | Japan | 98/2.11 |

Primary Examiner—John K. Ford
Attorney, Agent, or Firm—Oblon, Spivak, McClelland, Maier & Neustadt

[57] ABSTRACT

Car air conditioning equipment comprising: an air feeding device for feeding a constant amount of air; air-blow outlets for blowing air with an adjusted temperature into a car interior; an interior temperature detector for detecting a temperature in the car interior; a blown-air temperature detector for detecting a temperature of air blown out from the air outlet; a temperature controlling device for outputting a heating-cooling control signal to control the flow of heating-air and the flow of cooling-air which temporally varies, based on the detected interior temperature and the detected blown-air temperature; and a temperature adjusting device which includes a heating-cooling device for heating and cooling the air from the air feeding device and temporally varying the temperature of the heating-air and the cooling-air, and first mixing device for mixing the heating-air and the cooling-air from the heating-cooling device and supplying the mixed air with the adjusted temperature to the air outlet device. In a second embodiment electric heaters at the outlet vents are used to temporally vary the air temperature to avoid occupant boredom with constant temperature air.

1 Claim, 3 Drawing Sheets

UPPER TEMPERATURE LIMIT OF BLOWN-AIR TEMPERATURE VARIATION
SETTING TEMPERATURE
LOWER TEMPERATURE LIMIT OF BLOWN-AIR TEMPERATURE VARIATION
TIME

TEMPERATURE OF CHEST AIR-BLOW
60 SECONDS
BEGINNING OF TEMPERATURE VARIATION
STOP   BEGINNING

A TEMPERATURE VARIATION (ANOTHER SECOND EMBODIMENT)
60 SECONDS
10°C

5°C   10°C
5 SECONDS   120 SECONDS   10 SECONDS

CAR AIR CONDITIONING EQUIPMENT WITH TEMPERATURE VARIATION SYSTEM TO AVOID OCCUPANT BOREDOM WITH CONSTANT TEMPERATURE AIR

This application is a continuation of application Ser. No. 07/269,718, filed on Nov. 10, 1988, now abandoned.

BACKGROUND OF THE INVENTION

1. Field of the Invention

The present invention relates to car air conditioning equipment.

2. Description of Prior Art

Conventional car air conditioning equipment is provided with an air feeding device for feeding air, a temperature adjusting device for adjusting the temperature of the air fed from the air feeding device by heating/cooling and mixing the air, air-blow outlets for blowing the air with its temperature adjusted by the temperature adjusting device into a car interior, an interior temperature detector for detecting the temperature in the car interior, and a temperature control device for controlling the air feeding device and the temperature adjusting device so that the interior-temperature detected by the interior-temperature detector is made to be a previously set interior-temperature.

In such car air conditioning equipment, the temperature of air blown into the car room varies monotonically toward a previously set interior-temperature, and if the blown-air temperature becomes the set interior-temperature, the blown-air temperature becomes fixed and does not vary.

However, if the interior-temperature is maintained at a previously set comfortable value for a long time after it has reached the comfortable value, an occupant of the car becomes acclimatized to the comfortable temperature to thereby lose a comfortable feeling and comes to have a stagnant feeling and thereby an uncomfortable feeling.

There has been proposed car air conditioning equipment in which the flow and direction of blown-air are changed temporally in order to prevent the occupant in the car from having such a stagnant feeling and thereby an uncomfortable feeling (U.S. Pat. No. 4,495,560).

In this method of changing the flow of blown-air, however, a change in sound level is caused as the flow of blown-air varies. If the sound level varies, the human hearing sense is strongly aware of the sound as a noise even when the sound level is low. Thus, in this method, an uncomfortable feeling for the sound may be caused invariably even if the occupant becomes thermally comfortable. Accordingly, this method is unsuitable as an air conditioning method to obtain a comfortable feeling. Further, in this method, the flow of air is changed in view of the entire interior, so that a delay occurs in realizing a comfortable feeling.

In the method of changing the direction of air, on the other hand, the occupant loses an a feeling of the existence of air conditioning feeling and hence has an uncomfortable feeling when the direction of the blown air is changed so that the blown-air does not to blow on the occupant. Accordingly, this method is unsuitable as an air conditioning method to obtain a comfortable feeling.

In some ordinary air conditioning equipment which is not car air conditioning equipment, on the other hand, the blown-air temperature is changed as time passes so as to prevent a person from being acclimatized to a comfortable temperature to thereby lose a comfortable feeling.

In ordinary air conditioning equipment, however, if there occurs an external disturbance due to a change in output of a temperature adjusting device or a change in the open air temperature, a change in intensity of sunshine, etc., the blown-air temperature does not vary as desired, so that a comfortable feeling cannot be obtained.

Accordingly, this method is unsuitable as car air conditioning equipment in which an external disturbance as described above is caused frequently.

SUMMARY OF THE INVENTION

It is therefore an object of the present invention to solve the above problems in the prior art.

As the result of a study, the inventor of this application has found that in order to make an occupant in a car obtain a comfortable feeling by means of blown-air, the following conditions must be satisfied.

1) The occupant can obtain a comfortable feeling when the temperature of air blown spot-like onto exposed portions of the front of the occupant such as the face, neck, arms, etc. of the occupant exposed by the clothes of the occupant varies.

The occupant cannot obtain a comfortable feeling even if the temperature of the air blown onto the occupant's feet or against window glass varies.

Accordingly, it is not necessary at all to change the temperature of air blown out from a foot air-blow outlet toward the feet of the occupant, the temperature of air blown out from a defrosting-air blow outlet toward the window glass, and the temperature in the whole of the car room, but it is necessary to change the temperature of air blown out from a air-blow outlet opened toward the chest of the occupant (hereinafter referred to as "chest air-blow outlet").

2) The occupant can obtain a comfortable feeling if the temperature of air blown out toward the chest of the occupant vary under the condition that the interior-temperature is near a comfortable value for the occupant.

The occupant cannot obtain a comfortable feeling even if the temperature of air blown out toward the chest of the occupant is changed in the condition that the interior-temperature is far from a comfortable value for the occupant.

Accordingly, it is necessary to change the temperature of air blown out toward the chest of the occupant under the condition where the interior-temperature is near a comfortable value for the occupant.

3) The occupant can obtain a comfortable feeling if the temperature of air blown out toward the chest of the occupant varies within a range near a comfortable value for the occupant. Accordingly, it is necessary to accurately control the temperature of air blown out toward the chest of the occupant even under the condition where there exists an external disturbance.

4) When the temperature of air blown out toward the chest of the occupant is changed, an uncomfortable feeling may be caused by noises if the flow of the air varies. Accordingly, the flow of the air should be prevented from varying as the temperature of the air is changed.

Car air conditioning equipment according to the present invention comprises: an air feeding device for feeding a constant amount of air (at a time of supplying air flow with temporally varied temperature to a car's interior, and feeding a constant or varied amount at other times); air-blow outlet means for blowing air with an adjusted temperature into a car room; an interior-temperature detector for detecting a temperature in the car room; a blown-air temperature detector for detecting a temperature of air blown out from the air-blow outlet means; a temperature controlling device for outputting a heating-cooling control signal to control the flow of heating-air and the flow of cooling-air which temporally varies, based on the detected interior-temperature and the detected blown-air temperature; and a temperature adjusting device comprising heating-cooling means for heating and cooling the air from the air feeding device and temporally varying the temperature of the heating-air and the cooling-air, and first mixing means for mixing the heating-air and the cooling-air from the heating-cooling means and supplying the mixed air with the adjusted temperature to the air-blow outlet means.

The temperature controlling device may comprise ratio control means for outputting a signal to control the mixing ratio of the flows of heating-air and cooling-air, based on the difference between the detected room-temperature and a predetermined interior-temperature; and mixing control means for outputting a signal to control the mixing amount of the heating-air and cooling-air at the first mixing means, based on the temperature-variation of the blown-air. The temperature adjusting device may comprise the heating-cooling means for adjusting the flow of heating-air and cooling-air based on the signal from the ratio control means; and second mixing means for controlling the ratio of a secondary mixing air of the heating-air and the cooling-air added to the air adjusted by the heating-cooling means, based on the signal from the mixing control means.

The air-blow outlet means preferably opens at a position opposed to the chest of an occupant in the car's interior. The temperature adjusting device may be disposed upstream of a plurality of said air-blow outlet means, and may comprise a secondary temperature control means for secondarily controlling a temperature of the adjusted air.

The temperature adjusting device may further comprise: an air path connected to the first mixing means; a heating path connected to heating-air flow control means; a cooling path connected to cooling-air flow control means; and the second mixing means, thereby adding the divided heating and cooling-air to the adjusted air, and supplying the resultant air to the air-blow outlet means.

The temperature adjusting device may further comprise: an air path connected to the first mixing means; a cooling path connected to cooling-air flow control means; second mixing means; and sub-paths each having said secondary temperature control means, thereby heating the mixed air from the second mixing means, and supplying the resultant air to the air-blow outlet means. The temperature controlling device may further comprise memory means for storing a pattern of temporal variation of the air temperature to provide a comfortable feeling when the air is blown onto the chest of the occupant, so that the temperature controlling device outputs, based on the stored temperature-variation pattern, a heating-cooling control signal for controlling the flows of heating-air and cooling-air in response to signals representative of the blown-air temperature, the interior-temperature, the predetermined interior-temperature, and the opening and closing state of the air path.

In the blown-air temperature-variation control system in a car air conditioning equipment according to the present invention, the temperature of air blown out from the chest air-blow outlet opened toward the chest of an occupant sitting in the interior varies.

Accordingly, the temperature of air blown onto exposed portions of the chest of the occupant, such as the face, neck, arms, etc., exposed from clothes of the occupant varies so that the occupant can obtain a comfortable feeling.

Further, the temperature of air blown out from the chest air-blow outlet is changed when a difference between the room-temperature detected by the room-temperature detector and a previously set interior-temperature becomes a value within a previously set range.

Accordingly, since the temperature of air blown onto the chest of the occupant is changed in the condition that the room-temperature is near a comfortable value for the occupant, the occupant can obtain a comfortable feeling.

Further, the temperature of air blown out from the chest air-blow outlet is detected, and the variation of the temperature of air blown out from the chest air-blow outlet is controlled on the basis of the detected air-temperature.

Accordingly, even if there exists an external disturbance, the temperature-variation of the air blown out from the chest air-blow outlet can be accurately controlled and the occupant can obtain a comfortable feeling.

According to the present invention, since the flow of air blown out from the air-blow outlet is not fluctuated when the temperature of the air is changed, an uncomfortable feeling due to noises is not caused. Further, since the air blown onto the occupant is never extinguished by variations in direction of the air, and uncomfortable feeling due to variations in direction of the air is not caused. Accordingly, the occupant can obtain only a comfortable feeling.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Now, referring to the accompanying drawings, the preferred embodiments of the present invention will be described in detail hereunder.

<First Embodiment (FIGS. 1 and 2)>

Figure 1:
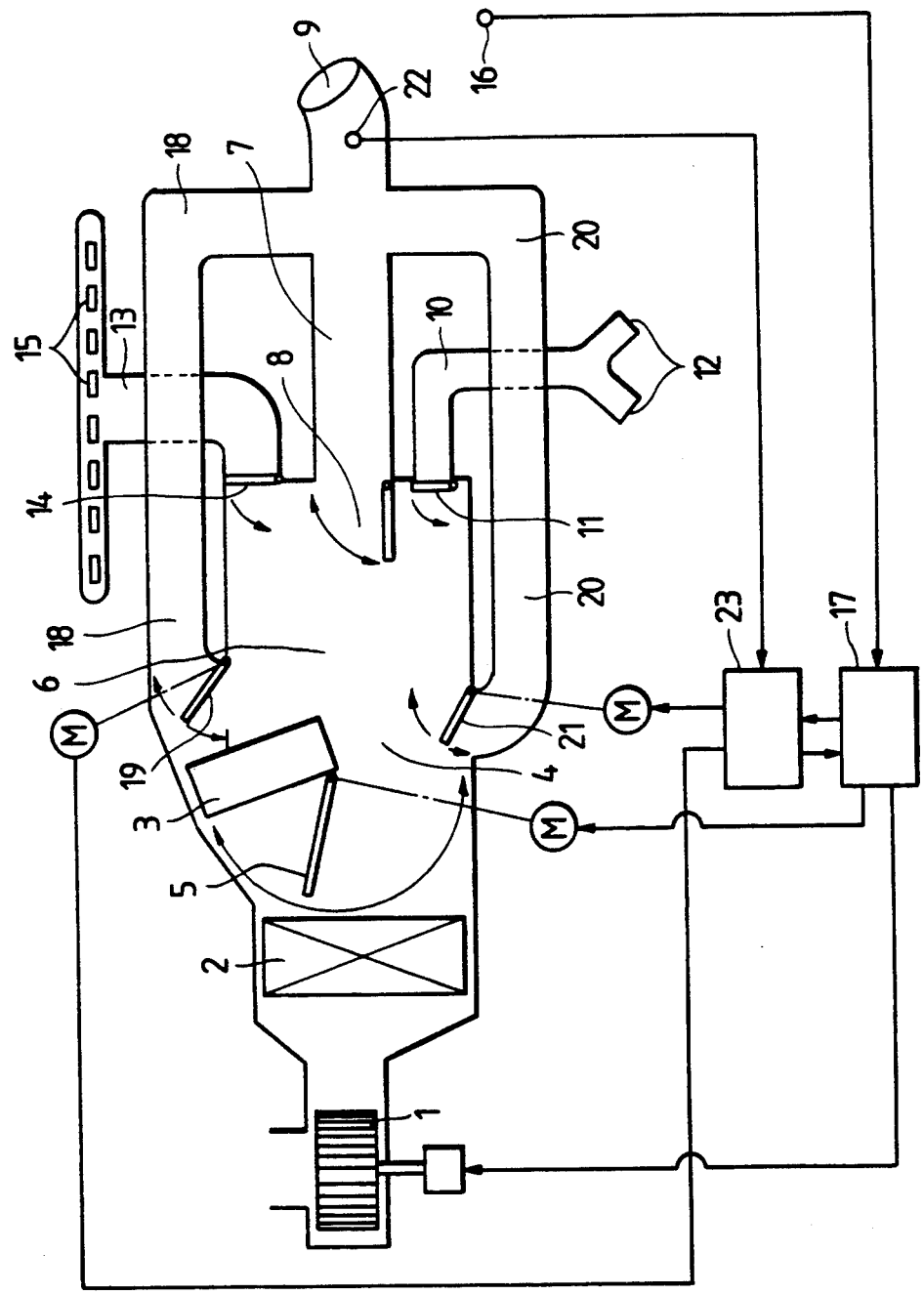
FIG. 1 is a schematic view showing car air conditioning equipment having the blown-air temperature-variation control system according to an embodiment of the present invention.

As shown in FIG. 1, the car air conditioning equipment provided with the blown-air temperature-variation control system according to a first embodiment of the present invention is arranged so that a blower 1 is provided so as to draw air from the interior or exterior of a car, an evaporator 2 of a refrigerator is provided on the outlet side of the blower 1 so as to cool the air fed from the blower 1, a heater 3 is provided on one side of the outlet of the evaporator 2 so as to use cooling water of an internal combustion engine of the car as a heat source, and a cooling-air passage or path 4 is provided on the other side of the outlet of the evaporator 2 adjacent to the heater 3, whereby a part of the cooling-air cooled by the evaporator 2 of the refrigerator is fed to the heater 3 so as to be heated, and the remainder of the cooling-air fed as is without being heated into the cooling-air path 4.

Further, as shown in FIG. 1, there is provided on the inlet side of the heater 3 an air mixing valve 5 having a valve plate and a motor for rotating the valve plate so as to adjust the ratio with which the cooling-air cooled by the evaporator 2 of the refrigerator is distributed to the heater 3 and the cooling-air path 4, and there is provided an air mixing chamber 6 on the outlet side of the heater 3 and on the outlet side of the cooling-air path 4 so as to mix the air heated by the heater 3 and the cooling-air passed through the cooling-air path 4 with each other.

That is, those constituent parts 2 through 6 constitute a temperature adjusting device for cooling or heating the air fed from the blower 1, which is an air feeding device, so as to adjust the temperature of the air.

Further, as shown in FIG. 1, an air passage or path 7 extended to the front side of an occupant seating in the car room is connected to the air mixing chamber 6 through an air-path valve 8 which is opened in cooling operation, and a chest air-blow outlet 9 opened toward the chest of the occupant seating in the car interior is provided at the forward end of the air path 7.

Further, as shown in FIG. 1, an air path 10 extended to the foot portion of the occupant seating in the car's interior is connected to the air mixing chamber 6 through a normally closed air-path valve 11 which is opened in heating operation, and a foot air-blow outlet 12 opened toward the feet of the occupant seating in the car interior is provided at the forward end of the air path 10.

Further, as shown in FIG. 1, an air path 13 extended to the inner surface lower side of car front window glass is connected to the air mixing chamber 6 through a normally closed air-path valve 14 which is opened in defrosting operation, and a defrosting air-blow outlet 15 opened toward the inner surface of the car front window glass is provided at the forward end of the air path 13.

A thermistor interior-temperature detector 16 for detecting a temperature in the car interior is provided in the car interior.

A computer-controlled feedback-type temperature control device 17 is provided so as to control the quantity of rotation of the valve plate of the air mixing valve 5 of the temperature adjusting device and the speed of rotation of the blower 1 on the basis of the interior-temperature detected by the interior-temperature detector 16, the open-air temperature detected by a not-shown open-air-temperature detector, and the intensity of solar radiation detected by a not-shown solar-radiation intensity detector so that the interior-temperature detected by the room-temperature detector 16 is made to be a value previously set up by a interior-temperature setter (not shown).

Further in the air mixing chamber 6, as shown in FIG. 1, an heating-air path 18 for flowing air heated by the heater 3 is connected to the outlet of the heater 3 through a flow adjusting valve 19, the forward end of the heating-air path 18 being connected to the chest air path 7.

Further in the air mixing chamber 6, as shown in FIG. 1, a cooling-air path 20 for flowing cooling-air passed through the cooling-air path 4 is connected to the outlet position of the cooling-air path 4 through a flow adjusting valve 21 with an opening adjusting motor, the forward end of the cooling-air path 20 being connected to the chest air path 7.

That is, those parts 18 through 21 constitute a temperature changing device for changing the temperature of the air blown out from the chest air-blow outlet 9.

The opening adjusting motors for the flow adjusting valves 19 and 21 of the temperature changing device are electrically connected to a temperature-variation control device 23, and the flow adjusting valves 19 and 21 are rotated by a certain angle in accordance with a signal from the temperature-variation control device 23 so as to adjust the respective openings of the flow adjusting valves 19 and 21.

A thermistor blown-air temperature detector 22 for detecting the temperature of the air blown out from the chest air-blow outlet 9 is provided in the chest air-blow outlet 9. The blown-air temperature detector 22 is electrically connected to the temperature-variation control device 23 so as to apply a detected blown-air temperature signal to the temperature-variation control device 23.

The temperature-variation control device 23 is electrically connected to a temperature control device 17 so as to receive an interior-temperature signal from the interior-temperature detector 16, a previously set interior-temperature signal, and signals indicating the opened/closed states of the normally closed air-path valves 8, 11, 14 through the temperature control device 17.

The temperature-variation control device 23 is composed of a computer which receives the blown-air temperature signal, the interior-temperature signal, the setting interior-temperature signal, and the signal for indicating the opened/closed states of the normally closed air-path valves, and which applies a signal indicating the quantity of rotation to the opening adjusting motor for adjusting the opening of the flow adjusting valve and applies a signal to the temperature control device 17 for fixing the speed of rotation of the blower 1. The temperature-variation control device 23 stores, in its ROM, a pattern of temporal variations of the air temperature which provides a comfortable feeling when the air is blown onto the exposed portions of the chest of the occupant and a previously set range (upper and lower limits) of the interior-temperature so that the temporal variation of the blown-air temperature can be performed on the basis of the setting interior-temperature. FIG. 2(b) shows an example of the temperature-variation pattern to be stored in the temperature-variation control device 23. In the illustrated example (A) in the drawing, the temperature is caused to vary periodically in the form of a sine wave, with a period of 60 seconds, and with a difference between the upper and lower temperature limits of 10° C.

However, the temperature-variation pattern is not limited to such a sinusoidal periodic variation as described above, but may be any temperature-variation with any combination of the period selected in a certain range (30 seconds - 5 minutes) except ranges in which the variation is too rapid and too slow to give a comfortable feeling to the occupant respectively, and the difference between the upper and lower temperature limits selected in a range of from 2° C. to 20° C. in which the occupant can sense the temperature-variation examples (B) and (C) in FIG. 2(b)).

Further, it is not necessary to fix the period and the difference between the upper and lower temperature limits, but the period and the difference between the upper and lower temperature limits may be changed in the respective ranges as described above (for example, random variation).

Further, the temperature-variation device 23 may be arranged to store a plurality of blown-air temperature-variation patterns so that the occupant may select one of those desired patterns.

Upon detection that the interior-temperature is not within the range in which the temporal variation of the blown-air temperature is to be performed on the basis of the received interior-temperature signal and the setting temperature signal, the temperature-variation control device 23 applies a signal to the opening adjusting motors so as to close the flow adjusting valves 19 and 21 so that the temporal variation of the air blown out from the chest air-blowing outlet 9 is not performed.

Upon detection that the interior-temperature is within the range in which the temporal variation of the blown-air temperature is to be performed on the basis of the received interior-temperature signal and the setting temperature signal, the temperature-variation control device 23 applies a signal to the temperature control device 17 so as to fix the speed of rotation of the blower 1 and simultaneously applies signals to the opening adjusting motors of the flow adjusting valves 19 and 21 so as to adjust the respective openings of the flow adjusting valves 19 and 21 so that the mixing rates of the cooling-air and the heating-air passed through the cooling-air path 20 and the heating-air path 18 respectively with the air the temperature of which has been adjusted by the temperature adjusting device, whereby the temperature of the air blown out from the chest air-blow outlet 9 is subject to the temporal variation stored in the temperature-variation control device 23.

During the performing of temperature-variation of the air blown out from the chest air-blow outlet 9, the temperature-variation control device 23 compares the received blown-air temperature signal with the stored temporal variation of the blown-air temperature. When there occurs a difference between the temperature-variation in the air blown out from the chest air-blow outlet 9 and the stored temporal variation of the blown-air temperature, the temperature-variation control device 23 applies signals to the opening adjusting motors of the flow adjusting valves 19 and 21 so as to correct the openings of the flow adjusting valves 19 and 21 to thereby make the variation of the blown-air temperature agree with the stored temporal temperature-variation which can provide a comfortable feeling to the occupant.

During the performing of temperature-variation of the air blown out from the chest air-blow outlet 9, in order to fix the flow of air blown into the car interior, the temperature-variation control device 23 applies signals to the opening adjusting motors of the flow adjusting valves 19 and 21 so as to control the opening adjusting motors to fix the sum of the flow of air passing through the cooling-air path 20 and the heating-air path 18 when the temperature-variation control device 23 detects that the air-path valve 8 is in a closed state or that either one or both of the normally closed air-path valves 11, 14 are in an opened state regardless of the opened/closed state of the air-path valve 8, in response to the signals from those air-path valves.

In cooling operation of the car air-conditioner provided with the blown-air temperature-variation control system according to this embodiment, the air-path valve 8 of the chest air path 7 is opened on the one hand, and the temperature-adjusted air is fed into the air mixing chamber 6 through the cooperation of the blower 1, the evaporator 2 of the refrigerator, the heater 3, and the air mixing valve 5 on the other hand, so that the temperature-adjusted air in the air mixing chamber 6 is blown out from the chest air-blow outlet 9 toward the chest of the occupant seating in the car interior through the normally closed air-path valve 8 which is now in an opened state and through the chest air path 7.

If the difference between the interior-temperature detected by the room-temperature detector 16 and the previously set room-temperature is so large as to be out of the previously set range, for example, as just after starting the operation, the temperature-variation control device 23 closes the flow adjusting valves 19 and 21 of the temperature changing device constituted by the components 18–21. Accordingly, the temperature changing device does not operate so that the temperature of the air blown out from the chest air-blow outlet 9 comes up or down monotonously.

When the difference between the room-temperature detected by the room-temperature detector 16 and the previously set room-temperature becomes enough to be of a value within the previously set range, the temperature-variation control device 23 controls the respective openings of the flow adjusting valves 19 and 21 of the temperature changing device so that the blown-air temperature detected by the blown-air temperature detector 22 is subject to the previously set temporal variation.

When only the normally closed air-path valve 8 is in an opened state in cooling operation, the flow of air blown our from the chest air flowing outlet 9 does not vary even if the respective openings of the flow adjusting valves 19 and 21 are changed in any manner so as to perform the previously set temporal variation of the blown-air of the blown-air temperature. Accordingly, only the temperature of the air blown out from the chest air-blow outlet 9 is changed up and down through the operation of the temperature changing devices 18–21.

Figure 2A:
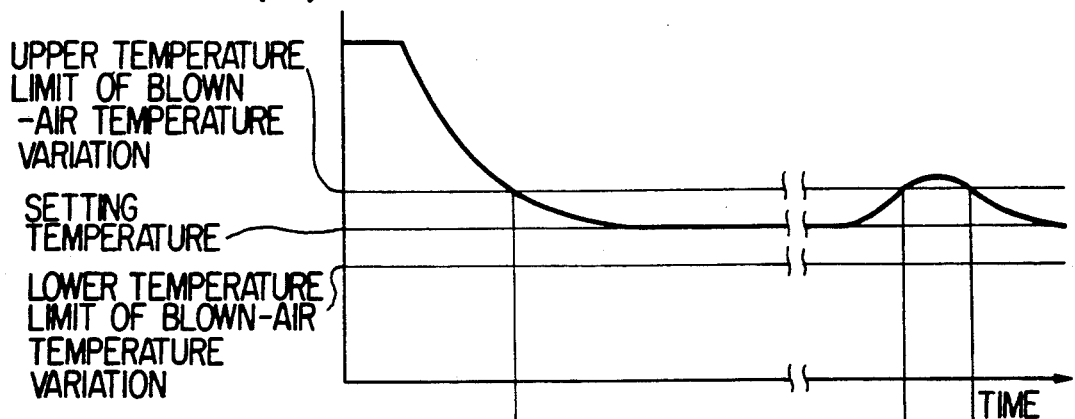
FIG. 2 shows diagrams (a) and (b) illustrating states of changes in temperature of a car interior and in temperature of air blown out toward the chest of an occupant, in cooling operation of the air conditioning equipment provided with the blow-air temperature-variation control system of FIG. 1.
Figure 2B:
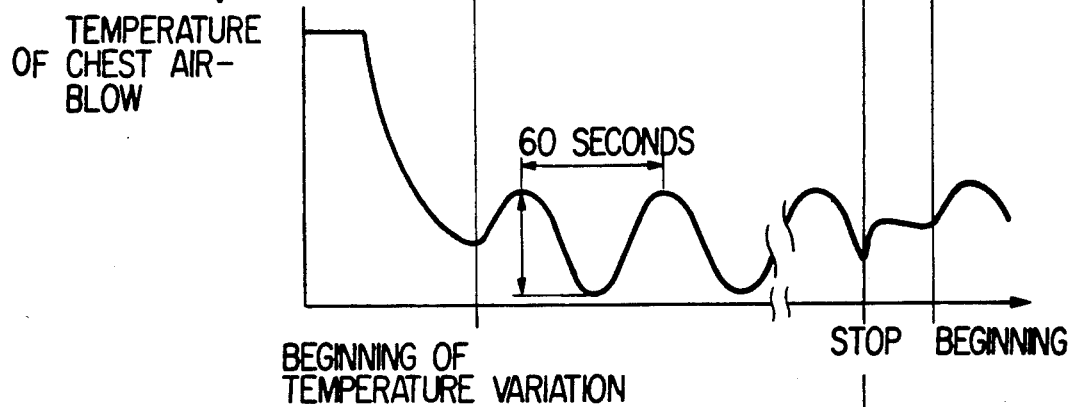
Figure 2C:
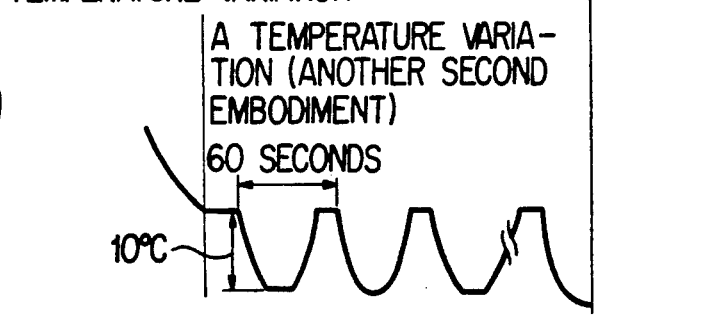
Figure 2D:
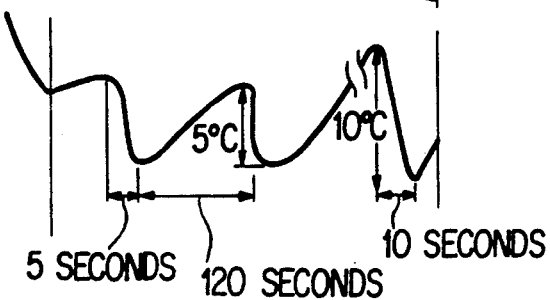

FIG. 2(a) shows the state of changes in the interior-temperature in cooling operation, and FIG. 2(b) shows the state of changes in the chest blown-air temperature corresponding to the changes in the room-temperature. That is, a solid line A shows continuous variations and a broken line B shows discontinuous variations.

In heating operation and defrosting operation, the air-path valve 8 of the chest air path 7 is closed. However, since the heating-air path 18 and the cooling-air path 20 are connected to between the air-path valve 8 of the bust air path 7 and the chest air-blow outlet 9, air can be blown out from the chest air-blow outlet 9 and the temperature of the blown-out air can be changed.

In heating operation, when the air-path valve 8 is in a closed state or when either one or both of the normally closed air-path valves 11 and 14 are in an opened stated regardless of the state of the air-path valve 8, the temperature-variation control device 23 controls the respective openings of the flow adjusting valves 19 and 21 so that the sum of the flow of heating-air flowing through the heating-air path 18 and the flow of cooling-air flowing through the cooling-air path 20 is made constant so as not to change the flow of air blown out from the chest air-blow outlet 9.

Accordingly, in heating operation and defrosting operation, an uncomfortable feeling due to a hot-air feeling on the chest of the occupant can be avoided so that the occupant can obtain a comfortable feeling by the variations in only the temperature of the air blown out from the chest air-blow outlet 9.

Although the temperature-variation control device 23 and the temperature control device 17 are separately provided in the foregoing embodiment, those devices 23 and 17 may be realized by one and the same device having both the functions of the devices 23 and 17.

Although the number of the temporal variation pattern of the blown-air temperature to be stored in the temperature-variation control device 23 has not been referred to in the foregoing embodiment, a plurality of patterns may be stored so that an occupant may select a desired one of those stored patterns.

<Second Embodiment (FIG. 3)>

The car air conditioning equipment provided with the blown-air temperature control system according to the second embodiment of the present invention is different from that of the first embodiment in the following points. That is, as shown in FIG. 3, a chest air path 7 is branched off into sub-paths 31 equal number to the fixed member or the number of car seats, the respective forward ends of chest air sub-paths 31 are disposed on the respective front sides of occupants seating in the car interior, and chest air-blow outlets 32 opened toward the respective chests of the occupants seating in the car interior are provided on the respective forward ends of the chest air sub-paths 31.

Figure 3:
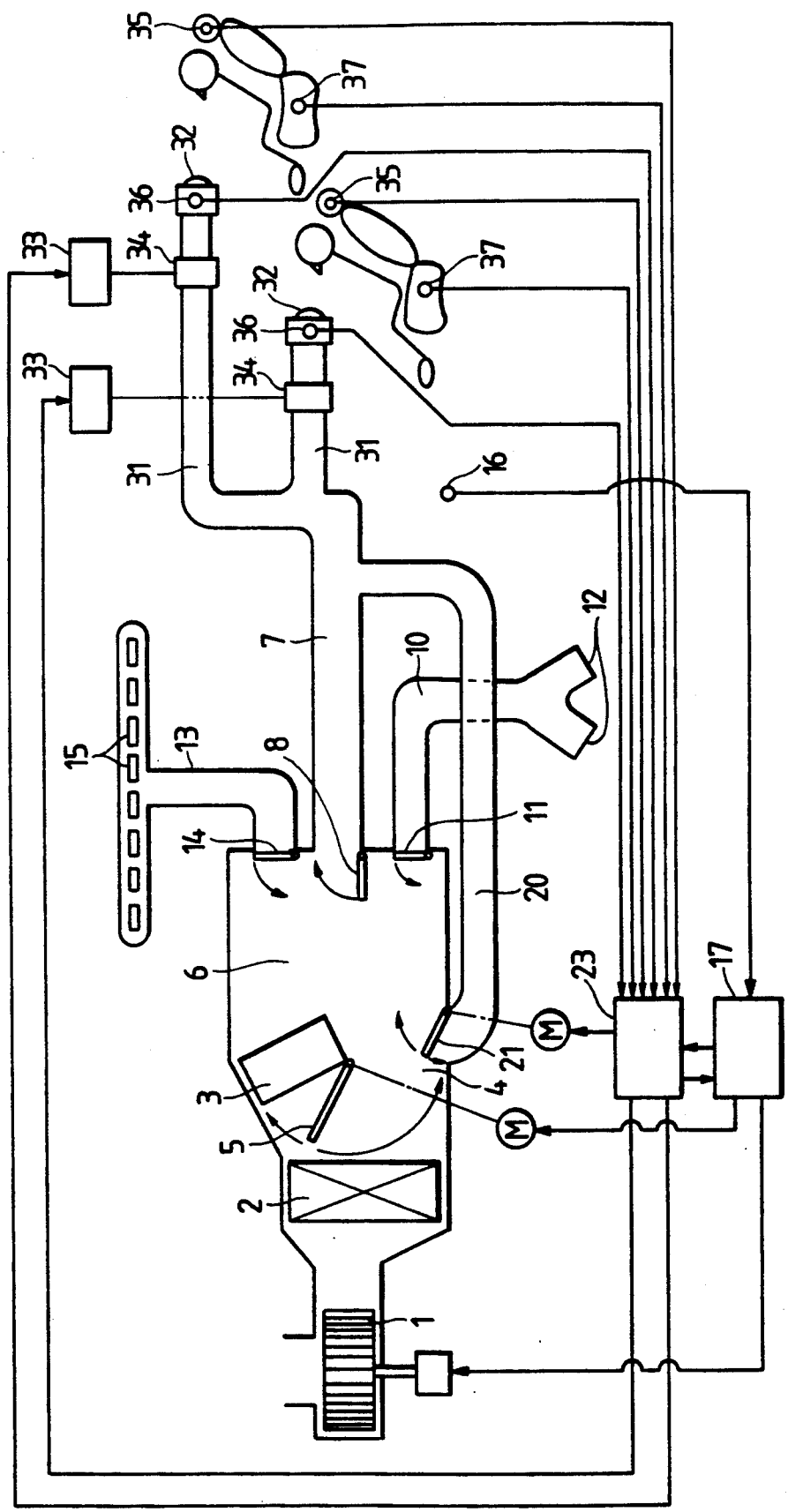
FIG. 3 is a schematic view showing car air conditioning equipment having the blown-air temperature-variation control system according to a second embodiment of the present invention.

As shown in FIG. 3, electric heating devices 34 each having a calorific-value adjuster 33 are provided on the respective chest air sub-paths 31 in place of the heating-air path 18 having the flow adjusting valve 19 of the first embodiment and control the blown-air temperature secondarily.

As shown in FIG. 3, blown-air temperature detectors 35 for detecting the temperatures of air blown out from the respective chest air-blow outlets 32 are provided on the upper portions of the backs of the respective car seats. A temperature-variation control device 23 is arranged to adjust the calorific value adjusters 33 of the respective seat heating devices 34 and the opening of a flow adjusting valve 21, on the basis of the blown-air temperatures detected by the respective blown-air temperature detectors 35.

As shown in FIG. 3, a direction detector 36 is provided at the corresponding chest air-blow outlet 32 so that the direction detector 36 produces an output when the corresponding chest air-blower outlet 32 is opposed to the chest of the corresponding occupant. When no output is produced in the direction detector 36, the temperature-variation control device 23 does not actuate the heating device 34 for the corresponding seat.

As shown in FIG. 3, a seated occupant detector 37 is provided on each car seat so that the sitting detector 37 produces an output when an occupant is sitting on the seat. When no output is produced by any one of the sitting detector 37, the temperature-variation control device 23 does not actuate the heating device 34 for the corresponding seat.

In the car air conditioning equipment provided with the blown-air temperature changing device of this second embodiment, if the difference between the interior-temperature detected by an interior-temperature detector 16 and the previously set interior-temperature becomes a value within the previously set range, the temperature-variation control device 23 detects the seat or seats at each of which both the direction detector 36 and the seated occupant detector 37 associated with the seat are producing their outputs, and controls the calorific-value adjuster of the heating device 34 associated with the detected seat and the opening of the flow adjusting valve 21 of the cooling-air path 20 so that the blown-air temperature detected by the blown-air temperature detector 35 associated with the detected seat is subject to the previously set temporal variation.

When only the normally closed air-path valve 8 is in an opened state in cooling operation, the flow of air blown out from the chest air flowing outlet 32 does not vary even if the opening of the flow adjusting valve 21 is changed in any manner by the temperature-variation control device 23 so as to perform the previously set temporal variation of the blown-air of the blown-air temperature.

In heating operation, when the normally closed air-path valve 8 is in a closed state or when either one or both of the normally closed air-path valves 11 and 14 are in an opened state regardless of the state of the normally closed air-path valve 8, the temperature-variation control device 23 controls the opening of the flow adjusting valve 21 so that the flow of cooling-air flowing through the cooling-air path 20 is made constant so as not to change the flow of air blown out from the chest air-blow outlet 9.

Accordingly, the air blown out from the chest air-blow outlet 32 for the detected seat is subject to the previously set temporal variation only with respect to the temperature thereof.

When the blown-air temperature is to be subject to temporal variation at a plurality of ones of the chest air-blow outlets 32, the temperature-variation control device 23 controls the opening of the flow adjusting valve 21 of the cooling-air path 20 so as to be suitable to the chest air-blow outlet 23 which most requires cooling-air, and controls the calorific values of the respective heating devices 34 correspondingly.

Further, in place of the heating devices 34 provided on the respective chest air sub-paths 31 (FIG. 3), cooling devices may be provided to control the flow of cooling-air from the cooling devices, while controlling the cooling-air path 20 by means of the flow adjusting valve 21.

Since the other points of the second embodiment are the same as those corresponding ones in the first embodiment, the same parts as those in the first embodiment are correspondingly referenced and a description about them will be omitted here.

What is claimed is:

1. Car air conditioning equipment, which comprises:
an air feeding device having means for feeding air to an interior of a car;

air outlet means for blowing air into said car interior;
a room-temperature detector means for detecting the temperature in said car interior;
a temperature detector means located in said air outlet means for detecting a temperature of air blown out from said air outlet means;
means for cooling air flow fed from said air feeding device to form a flow of cooling-air;
means for heating air flow fed from said air feeding device to form a flow of heating-air;
first air mixing means for mixing the heating-air flow and the cooling-air flow from said heating means and cooling means, respectively, in a chamber and first air path means for supplying the mixed air flow from said chamber to said air outlet means via a first air path;
temperature control means for controlling the first air mixing means based upon at least the detected car interior-temperature and a set point temperature;
at least one second air path means interconnecting said chamber from a location both downstream of said means for heating the air and downstream of said means for cooling the air to said first air path at a location adjacent to said air outlet means;
at least one second air mixing means for controlling the flow of air through said at least one second air path means;
temperature variation control means, operative when the difference between the car interior-temperature and said set point temperature becomes smaller than a predetermined value, for controlling said air feeding device to feed a substantially constant amount of air and for varying the position of said second air mixing means responsive to the detected interior-temperature and the detected blown-air temperature to produce variations of flow through said at least one second air path which, when combined with the flow through the first air path, produce the variation in discharge temperature within an upper limit and lower limit of said set temperature without substantial variation of flow through said air outlet means.

* * * * *